US012694496B2

(12) United States Patent
Touze et al.

(10) Patent No.: US 12,694,496 B2
(45) Date of Patent: Jul. 28, 2026

(54) METHOD, DEVICE AND APPARATUS FOR AVOIDING CHROMA CLIPPING IN A TONE MAPPER WHILE MAINTAINING SATURATION AND PRESERVING HUE

(71) Applicant: InterDigital CE Patent Holdings, SAS, Paris (FR)

(72) Inventors: David Touze, Rennes (FR); Marie-Jean Colaitis, Cesson-Sevigne (FR); Robin Le Naour, Cesson-Sevigne (FR); Frederic Plissonneau, Thorigne-Fouillard (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 448 days.

(21) Appl. No.: 18/033,003

(22) PCT Filed: Oct. 14, 2021

(86) PCT No.: PCT/EP2021/078420
§ 371 (c)(1),
(2) Date: Apr. 20, 2023

(87) PCT Pub. No.: WO2022/084137
PCT Pub. Date: Apr. 28, 2022

(65) Prior Publication Data
US 2023/0394636 A1     Dec. 7, 2023

(30) Foreign Application Priority Data

Oct. 21, 2020   (EP) ................................... 20306253

(51) Int. Cl.
*G06T 5/00*     (2024.01)
*G06T 5/20*     (2006.01)
(Continued)

(52) U.S. Cl.
CPC .................. *G06T 5/92* (2024.01); *G06T 5/20* (2013.01); *G06T 5/50* (2013.01); *G06T 2207/20208* (2013.01)

(58) Field of Classification Search
CPC .... H04N 19/186; H04N 19/46; H04N 19/117; H04N 21/23439; H04N 23/741;
(Continued)

(56) References Cited

U.S. PATENT DOCUMENTS

2005/0219259 A1   10/2005   Gonsalves et al.
2008/0068510 A1   3/2008   Kanai
(Continued)

FOREIGN PATENT DOCUMENTS

CN         110612550 A      12/2019
CN         111699507 A       9/2020
(Continued)

OTHER PUBLICATIONS

Bross et al., "Study Text of 1SO/IEC DIS 23008-2 High Efficiency Video Coding", International Organization for Standardization, Coding of Moving Pictures and Audio, ISO/IEC JTC1/SC29/WG11, Document: MPEG 2012/N13155, Shanghai, China, Oct. 2012, 164 pages.
(Continued)

*Primary Examiner* — Li Liu
(74) *Attorney, Agent, or Firm* — Condo Roccia Koptiw LLP

(57)          ABSTRACT

A method comprising modifying a color correction function intended to correct initial chroma components of a current image to obtain normalized corrected chroma components for avoiding the clipping of the initial chroma components while maintaining saturation and preserving hue.

15 Claims, 10 Drawing Sheets

(51) Int. Cl.
    *G06T 5/50*           (2006.01)
    *G06T 5/92*           (2024.01)

(58) Field of Classification Search
    CPC ............. G06T 2207/20208; G06T 5/92; G06T
                             2207/10024; G06T 5/90
    See application file for complete search history.

(56) References Cited

U.S. PATENT DOCUMENTS

| | | | |
|---|---|---|---|
| 2011/0255101 A1 | 10/2011 | Edge | |
| 2017/0061576 A1 | 3/2017 | Lim et al. | |
| 2017/0256039 A1 | 9/2017 | Hsu et al. | |
| 2018/0007392 A1* | 1/2018 | Lasserre | H04N 19/186 |
| 2019/0073756 A1 | 3/2019 | Stessen | |
| 2019/0098317 A1 | 3/2019 | Lu et al. | |
| 2019/0114750 A1 | 4/2019 | Guérin et al. | |
| 2019/0164262 A1* | 5/2019 | Cellier | G06T 5/92 |
| 2019/0335082 A1* | 10/2019 | Chang | H04N 7/0125 |
| 2020/0169742 A1* | 5/2020 | Su | H04N 19/1887 |
| 2020/0193890 A1 | 6/2020 | Tichelaar et al. | |
| 2020/0296428 A1* | 9/2020 | Andrivon | H04N 19/70 |
| 2020/0349685 A1* | 11/2020 | Andrivon | H04N 19/46 |
| 2020/0357100 A1 | 11/2020 | Tichelaar | |
| 2021/0195221 A1* | 6/2021 | Song | H04N 19/154 |

FOREIGN PATENT DOCUMENTS

| | | |
|---|---|---|
| EP | 3528201 A1 | 8/2019 |
| KR | 20190059006 A | 5/2019 |
| WO | 2017157977 A1 | 9/2017 |
| WO | WO 2019101373 A1 | 5/2019 |

OTHER PUBLICATIONS

Anonymous, "High-Performance Single Layer High Dynamic Range (HDR) System for use in Consumer Electronics devices; Part 1: Directly Standard Dynamic Range (SDR) Compatible HDR System (SL-HDR1)", European Telecommunications Standards Institute, ETSI TS 103 433 V1.2.1, Aug. 2017, 123 pages.

Anonymous, "High-Performance Single Layer High Dynamic Range (HDR) System for use in Consumer Electronics devices; Part 2: Enhancements for Perceptual Quantization (PQ) transfer function based High Dynamic Range (HDR) Systems (SL-HDR2)", ETSI and European Broadcasting Union, ETSI TS 103 433-2 V1.2.1, Mar. 2020, 80 pages.

Sikudova et al., A Gamut Mapping Framework for Color-Accurate Reproduction of HDR Images, Institute of Electronic and Electrical Engineers (IEEE), IEEE Computer Graphics and Applications, vol. 36, Issue No. 4, Jul. 2016, 11 pages.

Anonymous, "Information technology—Coding of audio-visual objects—Part 10: Advanced Video Coding", International Organization for Standardization (ISO), International Standard ISO/IEC 14496-10, Second Edition, Oct. 1, 2004, 280 pages.

Anonymous, "Methods for Conversion of High Dynamic Range Content to Standard Dynamic Range Content and Vice-Versa", International Telecommunication Union (ITU), ITU-R Radiocommunication Sector of ITU, BT Series Broadcasting service (television) Report ITU-R BT.2446-0, Apr. 2019, 33 pages.

Anonymous, "High-Performance Single Layer High Dynamic Range (HDR) System for use in Consumer Electronics devices; Part 1: Directly Standard Dynamic Range (SDR) Compatible HDR System (SL-HDR1)", ETSI and European Broadcasting Union, ETSI TS 103 433-1 V1.3.1, Mar. 2020, 129 pages.

Anonymous, "High-Performance Single Layer High Dynamic Range (HDR) System for use in Consumer Electronics devices; Part 3: Enhancements for Hybrid Log Gamma (HLG) transfer function based High Dynamic Range (HDR) Systems (SL-HDR3)", EBU Operating Eurovision, European Broadcasting Union, ETSI TS 103 433-3 V1.1.1, Mar. 2020, 27 pages.

* cited by examiner

HDR Picture (RGB)

Mapping Parameters Derivation — 701

Derivation Luma — 702

Tone Mapping — 703

Gammatization — 704

Derivation Chroma — 705

Joint Signal Normalisation
and Color Correction — 706

Chroma Injection — 707

Conversion to Output Format — 708

Mapping
Parameters

SDR Picture

SDR Picture + Mapping Parameters

Conversion to Full Range — 801

Chroma Injection — 802

Derivation L' — 803

Inverse Color Correction — 804

Back to RGB from YUV — 805

Scaling of RGB — 806

Back to Linear Light — 807

Conversion to Output Format — 808

METHOD, DEVICE AND APPARATUS FOR AVOIDING CHROMA CLIPPING IN A TONE MAPPER WHILE MAINTAINING SATURATION AND PRESERVING HUE

CROSS REFERENCE TO RELATED APPLICATIONS

This application is a U.S. National Stage Application under 35 U.S.C. § 371 of International Patent Application No. PCT/EP2021/078420, filed Oct. 14, 2021, which is incorporated herein by reference.

This application claims priority to European Application No. 20306253.4, filed Oct. 21, 2020, which is incorporated herein by reference in its entirety.

1. TECHNICAL FIELD

At least one of the present embodiments generally relates to the field of distribution of HDR video using SL-HDRx systems (x=1, 2 or 3) and more particularly to a method, a device and an equipment for modifying a color correction function intended to correct initial chroma components of a current image represented by an initial luma component and said initial chroma components to obtain normalized corrected chroma components for avoiding chroma clipping while maintaining saturation and preserving hue.

2. BACKGROUND

Recent advancements in display technologies are beginning to allow for an extended dynamic range of color, luminance and contrast in images to be displayed. The term image refers here to an image content that can be for example a video or a still picture or image.

High-dynamic-range video (HDR video) describes video having a dynamic range greater than that of standard-dynamic-range video (SDR video). HDR video involves capture, production, content/encoding, and display. HDR capture and displays are capable of brighter whites and deeper blacks. To accommodate this, HDR encoding standards allow for a higher maximum luminance and use at least a 10-bit dynamic range (compared to 8-bit for non-professional and 10-bit for professional SDR video) in order to maintain precision across this extended range.

While technically "HDR" refers strictly to a ratio between the maximum and minimum luminance, the term "HDR video" is commonly understood to imply wide color gamut as well.

Although a number of HDR display devices have appeared, as well as image and video cameras capable of capturing images with an increased dynamic range, there is still a very limited number of HDR contents available. In addition, a majority of current content distribution systems are designed for transporting SDR contents.

The standard SL-HDRT (ETSI TS 103 433-1 series, latest version is v1.3.1) provides direct backwards compatibility by using metadata allowing reconstructing a HDR signal from a SDR video stream. One advantage of SL-HDR1 is to allow using SDR distribution networks and services already in place for distributing HDR contents. Moreover, SL-HDR1 allows for HDR rendering on HDR devices and SDR rendering on SDR devices using a single layer video stream.

The standard SL-HDR2 (ETSI TS 103 433-2 series, latest version is v1.2.1) is adapted for HDR devices. The standard SL-HDR2 allows to transmit ST-2084 (a.k.a PQ (Perceptual Quantizer) or HDR10) streams along with metadata. When the stream is received by a device only compatible with ST-2084 but not compatible with metadata, the latter ignores the metadata and displays images without knowing all of their technical details (depending on the device models and their processing capacities, color rendering and level details may not respect the original source). When a device supporting the ST-2084 format and metadata receives the stream, it displays an optimized image that best respects the intent of the content producer.

The standard SL-HDR3 (ETSI TS 103 433-3 v1.1.1) allows transmitting HLG (Hybrid Log Gamma) streams along with metadata. A SL-HDR3 system comprises a HDR/SDR reconstruction block based on a SL-HDR2 HDR/SDR reconstruction block, i.e. it is made with a cascade of a HLG to ST-2084 OETF (Opto-Electronic Transfer Function) converter and a SL-HDR2 HDR/SDR reconstruction block. An OETF describes the action of a sensor, converting from scene brightness to data.

In some typical SL-HDRx systems, the luma part of a SDR signal (i.e. the SDR luma) is computed applying a tone mapping operation on the luminance of an original HDR signal computed from the original HDR RGB components or on the luma of an original HDR signals computed from a gammatized versions of HDR RGB components of the original HDR signal (i.e. HDR luma). The chroma part of the SDR signal (i.e. the SDR chroma) is computed from a gammatized versions of HDR RGB components of the original HDR signal and from a color correction factor that depends on the computed SDR luma.

In some cases, generated SDR chroma components are clipped to a maximum possible value. The clipping is directly at the origin of reconstruction errors when reconstructing the HDR signal from the SDR signal.

To get rid of the SDR chroma components clipping, some methods are modifying a saturation of the computed SDR chroma components. However, these methods produce very desaturated SDR images that are no more consistent in terms of colors (i.e. in terms of hue) with the original HDR signal.

It is desirable to overcome the above drawbacks.

It is particularly desirable to define a method allowing to avoid the SDR chroma components clipping while maintaining saturation and preserving hue of the derived SDR signal.

3. BRIEF SUMMARY

In a first aspect, one or more of the present embodiments provide a method for modifying a color correction function intended to correct initial chroma components of a current image represented by an initial luma component and said initial chroma components to obtain normalized corrected chroma components, said color correction function being defined by a set of initial tuples comprising a first coordinate and a second coordinate, the method comprising, for the current image:

segmenting a range of luminance values of the initial luma component in partial luminance ranges, each frontier between two consecutive partial luminance ranges corresponds to a first coordinate of one of the initial tuples;

estimating an attenuation value for the initial chroma components in each partial luminance range, each attenuation value allowing lowering the initial chroma components to avoid a clipping of said component;

determining a global attenuation value for the initial chroma components from the attenuation values determined for each partial luminance range;

computing a factor for each partial luminance range allowing maintaining a saturation in each partial luminance range based on the global attenuation value and the attenuation value associated to said partial luminance range;

for each frontier between two consecutive luminance ranges, computing a minimum factor representing a minimum of the factors computed for these two consecutive partial luminance ranges;

computing a final correction factor for each frontier between two consecutives partial luminance ranges based on the minimum factor corresponding to said frontier and the global attenuation value; and, modifying the second coordinate of at least one of the initial tuples using the final correction factors to obtain new tuples defining a new color correction function.

In an embodiment, the method comprises a temporal stabilization of the new tuples based on a filtering using new tuples computed for images preceding the current image.

In an embodiment, the temporal stabilization is executed in a set of images belonging to a same scene between two scene cuts.

In a second aspect, one or more of the present embodiments provide a device for modifying a color correction function intended to correct initial chroma components of a current image represented by an initial luma component and said initial chroma components to obtain normalized corrected chroma components, said color correction function being defined by a set of initial tuples comprising a first coordinate and a second coordinate, the device comprising:

means for segmenting a range of luminance values of the initial luma component in partial luminance ranges, each frontier between two consecutive partial luminance ranges corresponds to a first coordinate of one of the initial tuples;

means for estimating an attenuation value for the initial chroma components in each partial luminance range, each attenuation value allowing lowering the initial chroma components to avoid a clipping of said component;

means for determining a global attenuation value for the initial chroma components from the attenuation values determined for each partial luminance range;

means for computing a factor for each partial luminance range allowing maintaining a saturation in each partial luminance range based on the global attenuation value and the attenuation value associated to said partial luminance range;

means for computing, for each frontier between two consecutive luminance ranges, a minimum factor representing a minimum of the factors computed for these two consecutive partial luminance ranges;

means for computing a final correction factor for each frontier between two consecutives partial luminance ranges based on the minimum factor corresponding to said frontier and the global attenuation value; and, means for modifying the second coordinate of at least one of the initial tuples using the final correction factors to obtain new tuples defining a new color correction function.

In an embodiment, the device comprises means for applying a temporal stabilization of the new tuples based on a filtering using new tuples computed for images preceding the current image in a sequence of image.

In an embodiment, the device comprises means for applying the temporal stabilization in a set of images of the sequence of image belonging to a same scene between two scene cuts.

In a third aspect, one or more of the present embodiments provide a method of tone mapping an image comprising an initial luma component and initial chroma components, the method comprising:

modifying a color correction function using the method of the first aspect; and, applying a color correction on the initial chroma component based on the new color correction function.

In a fourth aspect, one or more of the present embodiments provide a method for distributing jointly images of a same content in HDR and SDR format to a client system, comprising:

applying the method of first or third aspect; and transmitting data representative of said new tuples to the client system in the form of metadata.

In a fifth aspect, one or more of the present embodiments provide an apparatus for tone mapping an image comprising an initial luma component and initial chroma components, the apparatus comprising:

the device according to the second aspect; and, means for applying a color correction on the initial chroma component based on the new color correction function.

In a sixth aspect, one or more of the present embodiments provide an apparatus for distributing jointly images of a same content in HDR and SDR format to a client system, comprising:

a device according to the second aspect or an apparatus according to the fifth aspect; and means for transmitting data representative of said new tuples to the client system in the form of metadata.

In a seventh aspect, one or more of the present embodiments provide an equipment comprising a device according to the second aspect or an apparatus according to the fifth or sixth aspect.

In a eighth aspect, one or more of the present embodiments provide a signal generated by the method of the first, third or fourth aspect or by the device of the second aspect or by the apparatus according to the fifth or sixth aspect or by the equipment of the seventh aspect.

In a ninth aspect, one or more of the present embodiments provide a computer program comprising program code instructions for implementing the method according to the first, third or fourth aspect.

In a tenth aspect, one or more of the present embodiments provide an information storage medium storing program code instructions for implementing the method according to the first, third or fourth aspect.

4. BRIEF SUMMARY OF THE DRAWINGS

5. DETAILED DESCRIPTION

Various aspects and embodiments are described in the following in the context of a SL-HDR1 system. However, these aspects and embodiments could be adapted to any SL-HDRx system comprising a color correction.

Figure 1:
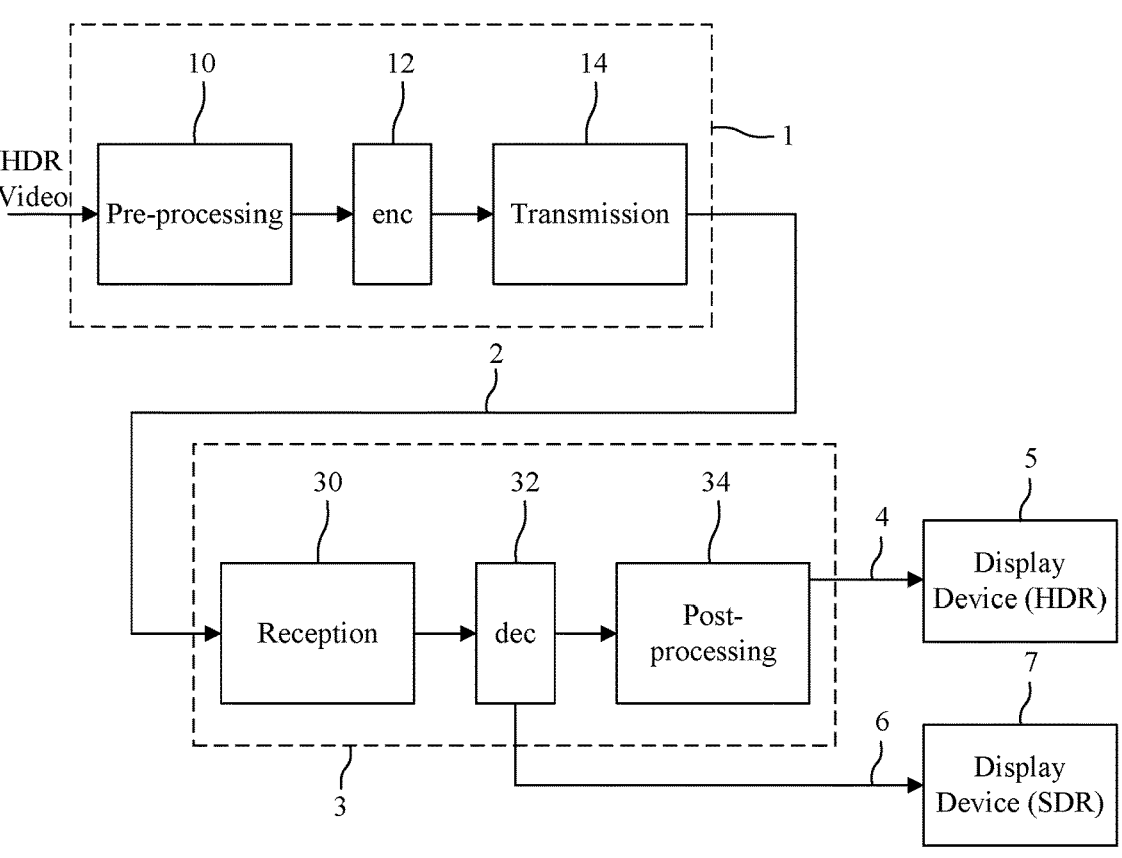
FIG. 1 illustrates an example of SL-HDRT system.

FIG. 1 illustrates an example of SL-HDR1 system.

The SL-HDR1 system of FIG. 1 comprises a server 1 and a client system 3 communicating via a communication network 2. The client system 3 is connected to a first display device, called HDR display device, 5 capable of displaying a HDR content using a communication link 4 and to a second display device, called SDR display device, 7 capable of displaying a SDR content, using a communication link 6.

The server 1 obtains an original HDR content and generates a SDR encoded signal and metadata.

The client 3 receives the SDR encoded signal and the metadata and generates a decoded SDR content and reconstructs a HDR content from the SDR decoded SDR content and the metadata.

Figure 2:
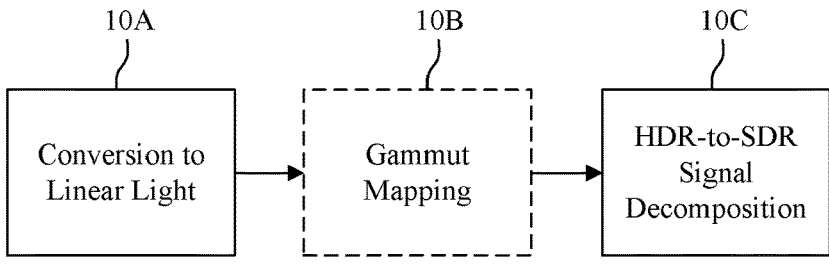
FIG. 2 illustrates schematically a detail of a pre-processing module of a SL-HDR1 system.

The server 1 comprises a pre-processing module detailed in relation to FIG. 2 an encoding module 12 and a transmission module 14.

The pre-processing 10 module generates a SDR content and metadata from the original HDR content applying a process described in the following in relation to FIGS. 7 and 9.

The encoding module 12 encodes said SDR content and the metadata. The encoding module 12, for example, generates an encoded video stream compliant with the video compression standards HEVC (ISO/IEC 23008-2-MPEG-H Part 2, High Efficiency Video Coding/ITU-T H.265) or AVC (ISO/IEC 14496-10-MPEG-4 Part 10, Advanced Video Coding) or the standard entitled Versatile Video Coding (VVC) under development. The metadata are for example carried out by SEI messages such as the user data registered SEI message, the HEVC Color Remapping Information (CRI) or Mastering Display Colour Volume (MDCV) SEI messages.

When encoded, the encoded video stream is transmitted by the transmission module 14 to the client system 3 via the communication network 2.

Figure 3:
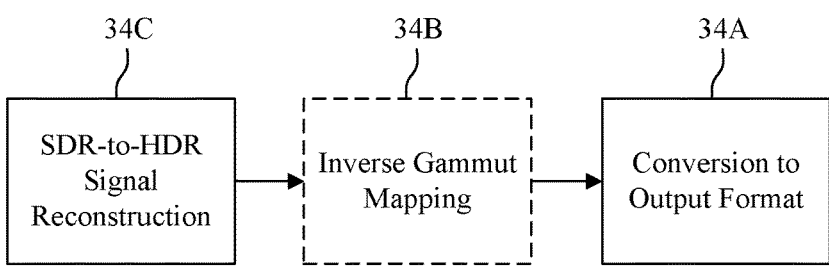
FIG. 3 illustrates schematically a detail of a post-processing module of a SL-HDR1 system.

The client system 3 comprises a reception module 30, a decoding module 32, and a post-processing module 34 detailed in relation to FIG. 3.

The reception module 30 receives the encoded video stream comprising the encoded SDR content and the metadata.

The decoding module 32 decodes the encoded video stream to reconstruct the SDR content and the metadata. No further processing is applied on the SDR content that is transmitted directly to the SDR display device 7.

Figure 8:
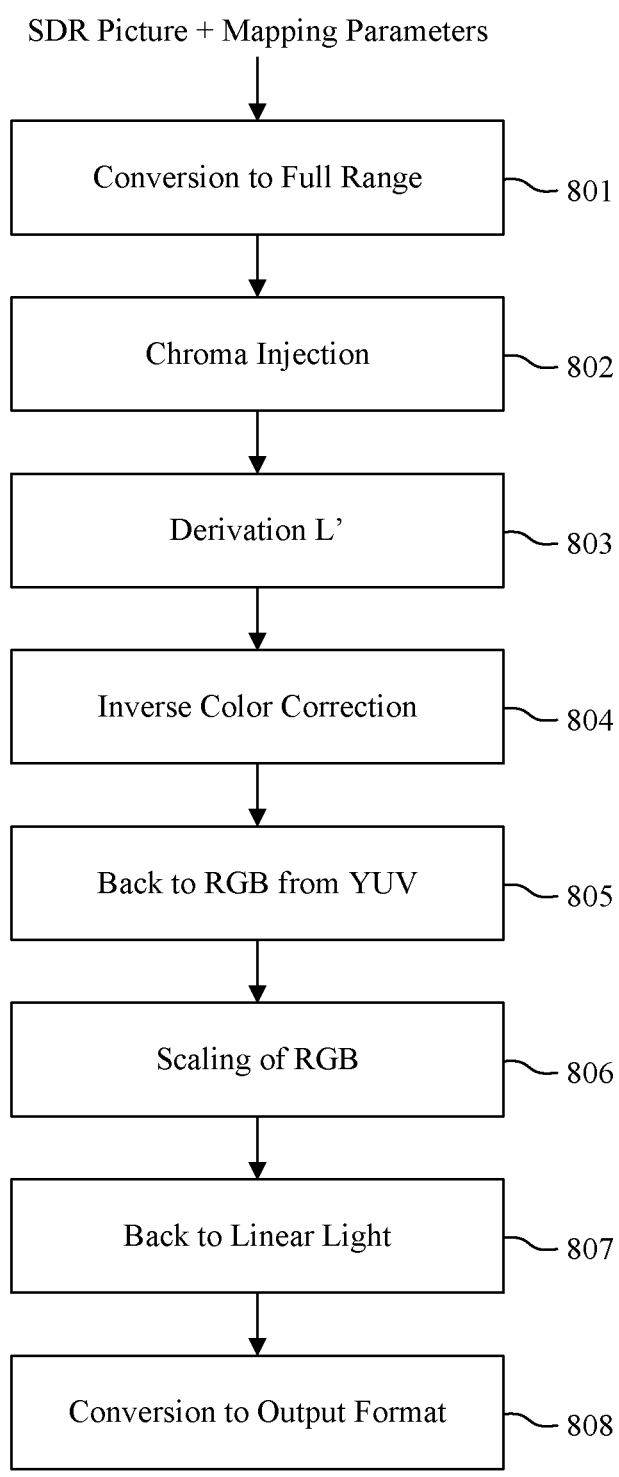
FIG. 8 illustrates schematically an example of post-processing process.

The post-processing module 34 reconstructs the HDR content from the decoded SDR content and metadata applying a process described in relation to FIG. 8.

FIG. 2 illustrates schematically a detail of the pre-processing module 10.

The pre-processing module 10 comprises conversion module 10A and a HDR-to-SDR signal decomposition module 10C.

The HDR-to-SDR signal decomposition module 10C requires linear-light RGB signal at its input. The conversion module 10A enables format adaptation to the input required by the HDR-to-SDR signal decomposition module 10C, i.e. it converts the input HDR video that can have any format (OETF, YUV, . . . ) into a linear-light RGB signal, if needed.

Figure 7:
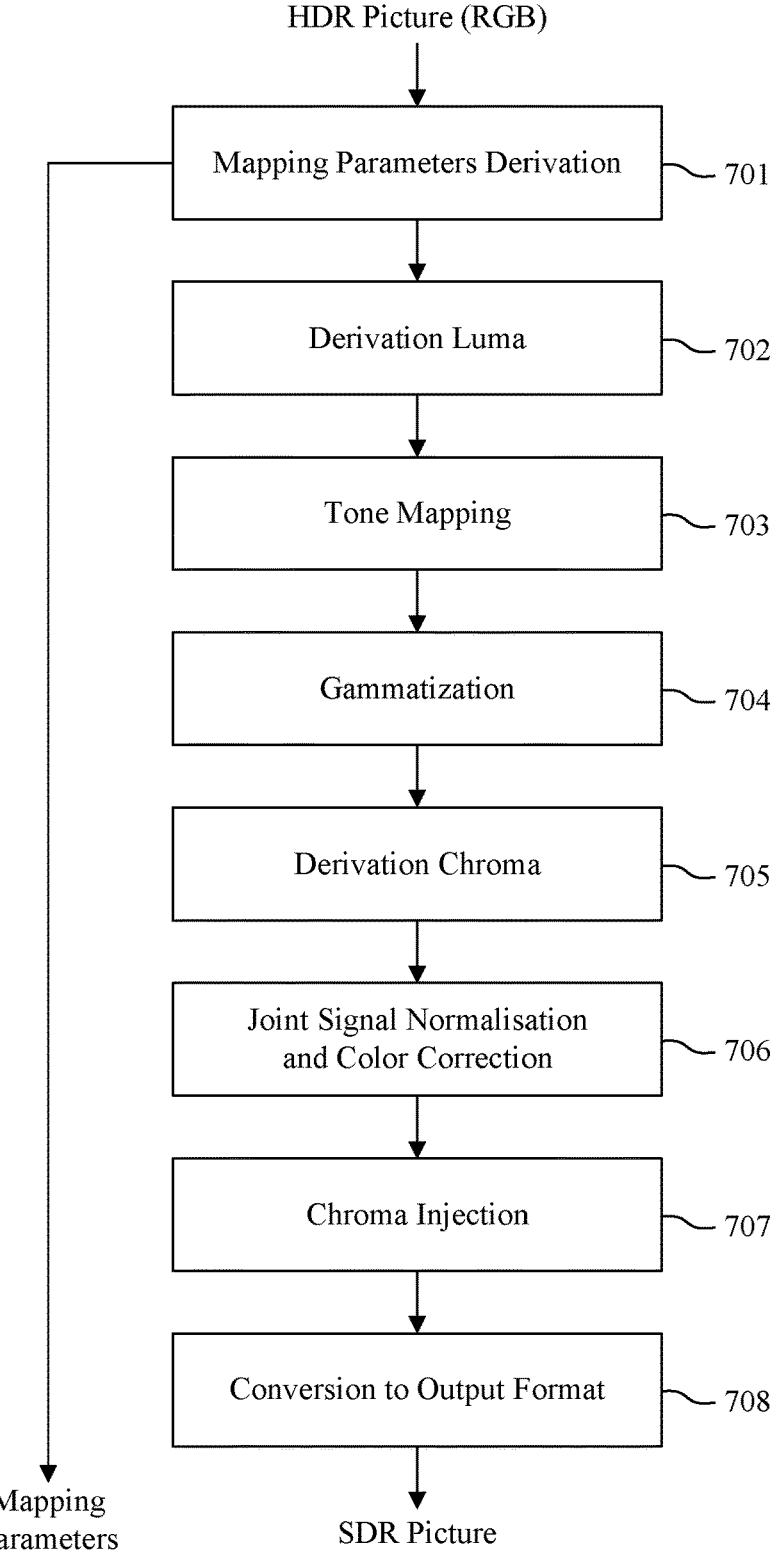
FIG. 7 illustrates schematically an example of pre-processing process.

The HDR-to-SDR signal decomposition module 10C generates a SDR backward compatible version of the original HDR signal, using an invertible process described in relation to steps 701 to 708 of FIG. 7 that guarantees a high quality reconstructed HDR signal.

In an embodiment, the pre-processing module 10 comprises an optional gamut mapping module 10B. The color gamut mapping module 10B may be used when the original HDR signal and the SDR signal are represented with different color gamut or color spaces.

FIG. 3 illustrates schematically a detail of the post-processing module 34.

The post processing module 34 comprises a SDR-to-HDR reconstruction module 34C and a conversion module 34A.

The SDR-to-HDR reconstruction module 34C receives the decoded SDR signal and the metadata and inverts the process of the HDR-to-SDR decomposition module 10C to reconstruct a HDR signal as described in relation to steps 801 to 807 of FIG. 8.

The conversion module 34A enables format adaptation of the reconstructed HDR signal to a targeted system (e.g. a Set Top Box (STB), a connected TV, etc.) connected with the client system 3. The conversion module 34A applies a process described by step 808 of FIG. 8.

In the embodiment wherein the pre-processing module 10 comprise a gamut mapping module 10B, the post-processing module 34 comprises an optional inverse gamut mapping module 34B inverting the process of the gamut mapping module 10B.

Figure 4:
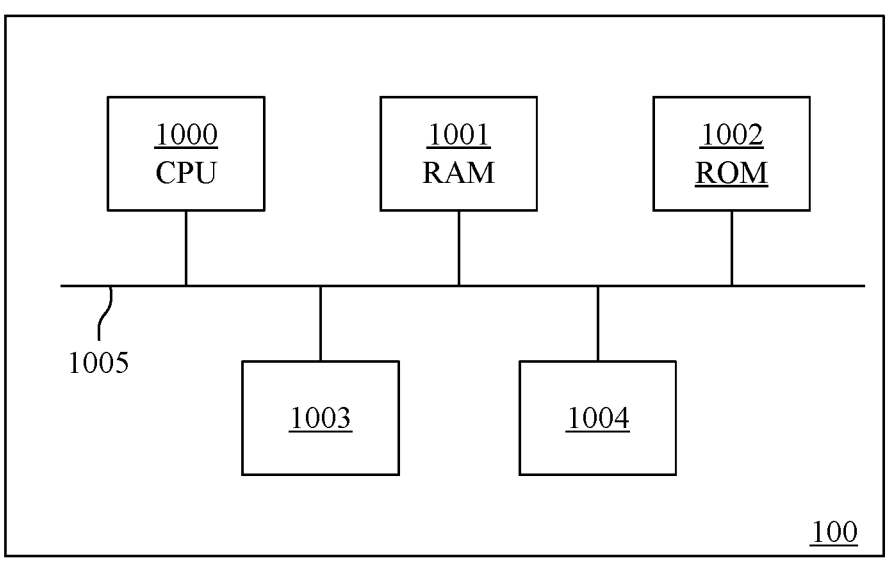
FIG. 4 illustrates schematically an example of hardware architecture of a processing module able to implement various aspects and embodiments.

FIG. 4 illustrates schematically an example of hardware architecture of a processing module 100 comprised in the server 1, in the pre-processing module 10, the encoding module 12 or the transmission module 14 or in the client system 3, in the reception module 30, the decoding module 32 or the post-processing module 34 and able to implement different aspects and embodiments. The processing module 100 comprises, connected by a communication bus 1005: a processor or CPU (central processing unit) 1000 encompassing one or more microprocessors, general purpose computers, special purpose computers, and processors based on a multi-core architecture, as non-limiting examples; a random access memory (RAM) 1001; a read only memory (ROM) 1002; a storage unit 1003, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive, or a storage medium reader, such as a SD (secure digital) card reader and/or a hard disc drive (HDD) and/or a network accessible storage device; at least one communication interface 1004 for exchanging data with other modules, devices, systems or equipment. The communication interface 1004 can include, but is not limited to, a transceiver configured to transmit and to receive data over the communication network 2. The communication interface 1004 can include, but is not limited to, a modem or a network card.

For example, the communication interface 1004 enables for instance the processing module 100:

to receive the original HDR content and to output the encoded video stream comprising the encoded SDR content and metadata when the processing module 100 is comprised in the server 1;

to receive the original HDR content and to output the SDR content with metadata when the processing module 100 is comprised in the pre-processing module 10;

to receive a SDR content and metadata and to output an encoded video stream representative said SDR content and of the metadata when the processing module 100 is comprised in the encoding module 12;

to receive the encoded video stream and to transmit the encoded video stream to the client system 3 when the processing module is comprised in the transmission module 14;

to receive the encoded video stream from the server 1 and output a corresponding SDR and/or HDR content when the processing module 100 is comprised in the client system 3;

to receive the encoded video stream from the server 1 and forward said encoded video stream to the decoding module 32 when the processing module 100 is comprised in the reception module 30;

to receive the encoded video stream from the reception module 30 and to output a reconstructed SDR content and metadata when the processing module 100 is comprised in the decoding module 32;

to receive the reconstructed SDR content and metadata and to output a reconstructed HDR content when the processing module 100 is comprised in post-processing module 34.

The processor 1000 is capable of executing instructions loaded into the RAM 1001 from the ROM 1002, from an external memory (not shown), from a storage medium, or from a communication network. When the processing module 100 is powered up, the processor 1000 is capable of reading instructions from the RAM 1001 and executing them. These instructions form a computer program causing, for example, the implementation by the processor 1000 of a pre-processing process described in relation to FIGS. 7 and 9, of an encoding process, of a decoding process and/or of a post-processing process described in relation to FIG. 8.

All or some of the algorithms and steps of said processes may be implemented in software form by the execution of a set of instructions by a programmable machine such as a DSP (digital signal processor) or a microcontroller, or be implemented in hardware form by a machine or a dedicated component such as a FPGA (field-programmable gate array) or an ASIC (application-specific integrated circuit).

Figure 5:
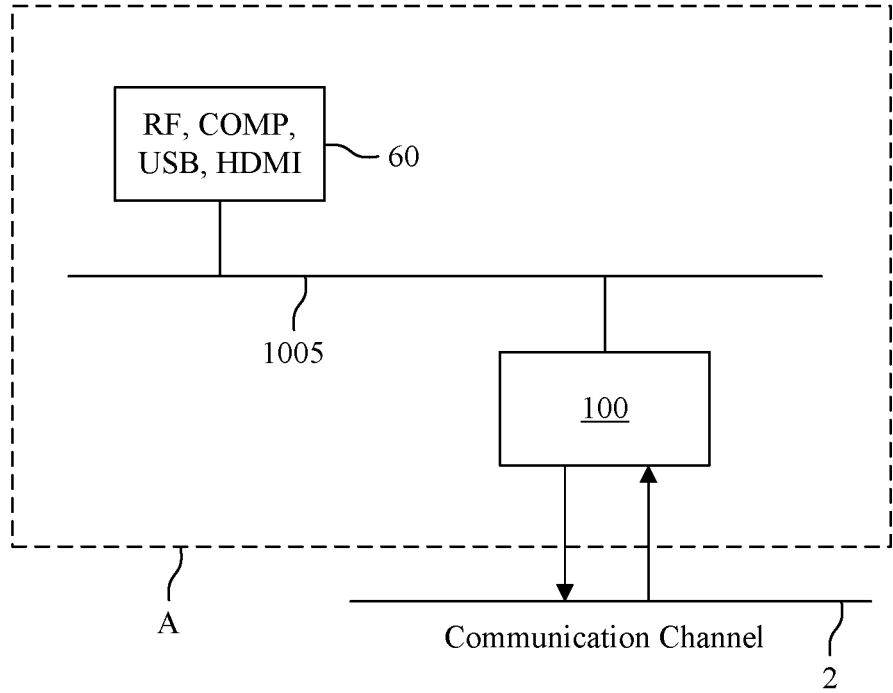
FIG. 5 illustrates a block diagram of an example of a first system in which various aspects and embodiments are implemented.

FIG. 5 illustrates a block diagram of an example of system A adapted to implement the server 1, the pre-processing module 10, the encoding module 12 and/or an transmission module 14 and in which various aspects and embodiments are implemented.

System A can be embodied as a device including the various components or modules described above and is configured to perform one or more of the aspects and embodiments described in this document. Examples of such system include, but are not limited to, various electronic systems such as personal computers, laptop computers, smartphones, tablet computers, connected home appliances, servers and a camera.

Components of system A, singly or in combination, can be embodied in a single integrated circuit (IC), multiple ICs, and/or discrete components. For example, in at least one embodiment, the system A comprises one processing module 100 that implement either the pre-processing process 10, the encoding module 12 or the transmission module 14 or any combination of these modules. In various embodiments, the system A is communicatively coupled to one or more other systems, or other electronic devices, via, for example, a communications bus or through dedicated input and/or output ports.

The input to the processing module 100 can be provided through various input modules as indicated in block 60. Such input modules include, but are not limited to, (i) a radio frequency (RF) module that receives an RF signal transmitted, for example, over the air by a broadcaster, (ii) a component (COMP) input module (or a set of COMP input modules), (iii) a Universal Serial Bus (USB) input module, and/or (iv) a High Definition Multimedia Interface (HDMI) input module. Other examples, not shown in FIG. 5, include composite video.

In various embodiments, the input modules of block 60 have associated respective input processing elements as known in the art. For example, the RF module can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF module of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF module includes an antenna.

Additionally, the USB and/or HDMI modules can include respective interface processors for connecting system A to other electronic devices across USB and/or HDMI connections. It is to be understood that various aspects of input processing, for example, Reed-Solomon error correction, can be implemented, for example, within a separate input processing IC or within the processing module 100 as necessary. Similarly, aspects of USB or HDMI interface processing can be implemented within separate interface ICs or within the processing module 100 as necessary. The demodulated, error corrected, and demultiplexed stream is provided to the processing module 100.

Various elements of system A can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the system A, the processing module 100 is interconnected to other elements of said system A by the bus 1005.

The communication interface 1004 of the processing module 100 allows the system A to communicate on the communication network 2. The communication network 2 can be implemented, for example, within a wired and/or a wireless medium.

Data is streamed, or otherwise provided, to the system A, in various embodiments, using a wireless network such as a Wi-Fi network, for example IEEE 802.11 (IEEE refers to the Institute of Electrical and Electronics Engineers). The Wi-Fi signal of these embodiments is received over the communications network 2 and the communications interface 1004 which are adapted for Wi-Fi communications. The communications network 2 of these embodiments is typically connected to an access point or router that provides access to external networks including the Internet for allowing streaming applications and other over-the-top communications. Still other embodiments provide streamed data to the system A using the RF connection of the input block 60. As indicated above, various embodiments provide data in a non-streaming manner, for example, when the system A is a camera, a smartphone or a tablet. Additionally, various embodiments use wireless networks other than Wi-Fi, for example a cellular network or a Bluetooth network.

The system A can provide an output signal to various output devices using the communication network 2 or the bus 1005. For example, when implementing the pre-processing module 10, the system A provides the output signal to the encoding module 12 using the bus 1005 or the communication network 2. When implementing the server 1, the system A provides the SDR signal and the metadata to the client system 3 using the communication network 2.

Various implementations involve applying a pre-processing process and or an encoding process. The pre-processing process or the encoding process, as used in this application, can encompass all or part of the processes performed, for example, on a received HDR image or video stream in order to produce a SDR content or an encoded SDR content with metadata. In various embodiments related to the encoding process, such process includes one or more of the processes typically performed by a video encoder, for example, an H.264/AVC (ISO/IEC 14496-10-MPEG-4 Part 10, Advanced Video Coding) encoder, an H.265/HEVC (ISO/IEC 23008-2-MPEG-H Part 2, High Efficiency Video Coding/ITU-T H.265) encoder, and H.266/VVC (Versatile Video Coding) encoder under development by a joint collaborative team of ITU-T and ISO/IEC experts known as the Joint Video Experts Team (JVET)) encoder, an AVI encoder or a VP9 encoder.

Figure 6:
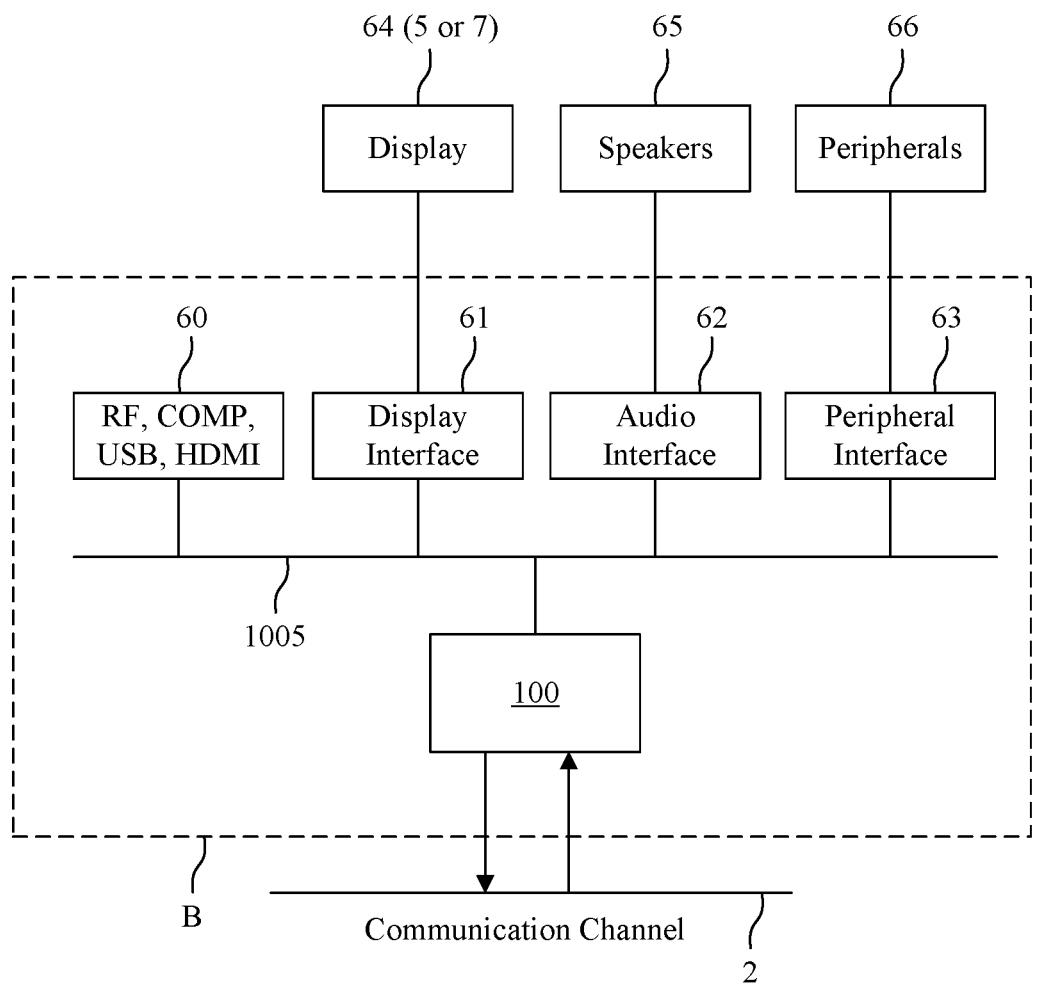
FIG. 6 illustrates a block diagram of an example of a second system in which various aspects and embodiments are implemented.

FIG. 6 illustrates a block diagram of an example of the system B adapted to implement a client system 3, a reception module 30, a decoding module 32 and/or a post-processing module 34 and in which various aspects and embodiments are implemented.

System B can be embodied as a device including the various components and modules described above and is configured to perform one or more of the aspects and embodiments described in this document.

Examples of such devices include, but are not limited to, various electronic devices such as personal computers, laptop computers, smartphones, tablet computers, digital multimedia set top boxes, digital television receivers, personal video recording systems, and a connected home appliances. Elements or modules of system B, singly or in combination, can be embodied in a single integrated circuit (IC), multiple ICs, and/or discrete components. For example, in at least one embodiment, the system B comprises one processing module 100 that implement either the reception module 30, the decoding module 32, and the post-processing module 34, or any combinations of these modules. In various embodiments, the system B is communicatively coupled to one or more other systems, or other electronic devices, via, for example, a communications bus or through dedicated input and/or output ports.

The input to the processing module 100 can be provided through various input modules as indicated in block 60 already described in relation to FIG. 5.

Various elements of system B can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the system B, the processing module 100 is interconnected to other elements of said system B by the bus 1005.

The communication interface 1004 of the processing module 100 allows the system B to communicate on the communication network 6. The communication network 2 can be implemented, for example, within a wired and/or a wireless medium.

Data is streamed, or otherwise provided, to the system B, in various embodiments, using a wireless network such as a Wi-Fi network, for example IEEE 802.11 (IEEE refers to the Institute of Electrical and Electronics Engineers). The Wi-Fi signal of these embodiments is received over the communications network 2 and the communications interface 1004 which are adapted for Wi-Fi communications. The communications network 2 of these embodiments is typically connected to an access point or router that provides access to external networks including the Internet for allowing streaming applications and other over-the-top communications. Still other embodiments provide streamed data to the system B using the RF connection of the input block 60. As indicated above, various embodiments provide data in a non-streaming manner. Additionally, various embodiments use wireless networks other than Wi-Fi, for example a cellular network or a Bluetooth network.

The system B can provide an output signal to various output devices, including the display 64 (corresponding to the display devices 5 or 7 in FIG. 1), speakers 65, and other peripheral devices 66. The display 64 of various embodiments includes one or more of, for example, a touchscreen display, an organic light-emitting diode (OLED) display, a curved display, and/or a foldable display. The display 64 can be for a television, a tablet, a laptop, a cell phone (mobile phone), or other devices. The display 64 can also be integrated with other components (for example, as in a smart phone), or separate (for example, an external monitor for a laptop). The display device 64 is SDR or HDR content compatible. The other peripheral devices 66 include, in various examples of embodiments, one or more of a stand-alone digital video disc (or digital versatile disc) (DVR, for both terms), a disk player, a stereo system, and/or a lighting system. Various embodiments use one or more peripheral devices 66 that provide a function based on the output of the system B. For example, a disk player performs the function of playing the output of the system B.

In various embodiments, control signals are communicated between the system B and the display 64, speakers 65, or other peripheral devices 66 using signaling such as AV.Link, Consumer Electronics Control (CEC), or other communications protocols that enable device-to-device control with or without user intervention. The output devices can be communicatively coupled to system B via dedicated connections through respective interfaces 61, 62, and 63. Alternatively, the output devices can be connected to system B using the communication network 2 via the communication interface 1004. The display 64 and speakers 65 can be integrated in a single unit with the other components of system B in an electronic device such as, for example, a television. In various embodiments, the display interface 61 includes a display driver, such as, for example, a timing controller (T Con) chip.

The display 64 and speakers 65 can alternatively be separate from one or more of the other components, for example, if the RF module of input 60 is part of a separate set-top box. In various embodiments in which the display 64 and speakers 65 are external components, the output signal can be provided via dedicated output connections, including, for example, HDMI ports, USB ports, or COMP outputs.

Various implementations involve applying a post-processing process comprising and a decoding process. The decoding process, as used in this application, can encompass all or part of the processes performed, for example, on a received encoded video stream in order to produce a SDR signal. In various embodiments, such decoding process include one or more of the processes typically performed by an image or a video decoder, for example, an H.264/AVC (ISO/IEC 14496-10-MPEG-4 Part 10, Advanced Video Coding) decoder, H.265/HEVC (ISO/IEC 23008-2-MPEG-H Part 2, High Efficiency Video Coding/ITU-T H.265) decoder, an H.266/VVC (Versatile Video Coding) decoder under development by a joint collaborative team of ITU-T and ISO/IEC experts known as the Joint Video Experts Team (JVET)) decoder, and AVI decoder or a VP9 decoder. The post-processing process encompasses all process required to reconstruct an HDR content from a reconstructed SDR content and metadata.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, retrieving the information from memory or obtaining the information for example from another device, module or from user.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", "one or more of" for example, in the cases of "A/B", "A and/or B" and "at least one of A and B", "one or more of A and B" is intended to encompass the selection of the first listed option (A) only, or the selection of the second listed option (B) only, or the selection of both options (A and B). As a further example, in the cases of "A, B, and/or C" and "at least one of A, B, and C", "one or more of A, B and C" such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations or embodiments can produce a variety of signals formatted to carry information that can be, for example, stored or transmitted. The information can include, for example, instructions for performing a method, or data produced by one of the described implementations or embodiments. For example, a signal can be formatted to carry a SDR image or video sequence and metadata of a described embodiment. Such a signal can be formatted, for example, as an electromagnetic wave (for example, using a radio frequency portion of spectrum) or as a baseband signal. The formatting can include, for example, encoding a SDR image or video sequence with metadata in an encoded stream and modulating a carrier with the encoded stream. The information that the signal carries can be, for example, analog or digital information. The signal can be transmitted over a variety of different wired or wireless links, as is known. The signal can be stored on a processor-readable medium.

FIG. 7 illustrates schematically an example of pre-processing process.

The example of pre-processing process is adapted to a SL-HDR1 system in NCL (Non Constant Luminance) mode. In this example, the pre-processing module 10 receives an original HDR content and generates a SDR content and metadata. The pre-processing process is executed by the processing module 100 comprised in the server 1, on each pixel of each image of the original HDR content. In the example of FIG. 7, a pixel comprises three color components corresponding to the primary colors Red (R), Green (G) and Blue (B), i.e. a pixel is a RGB signal.

In a step 701, the processing module 100 obtains an image of an original HDR content and derives mapping parameters from said image and its characteristics as described for example in the standard SL-HDRT. Said Mapping parameters are transmitted as metadata to the client system 3.

In a step 702, the processing module 100 derives a luminance (luma) component L' from the linear-light RGB signal of the image as follows.

$$L' = A_1 \begin{bmatrix} R^{\frac{1}{\gamma}} \\ G^{\frac{1}{\gamma}} \\ B^{\frac{1}{\gamma}} \end{bmatrix} \tag{eq. 1}$$

where $A_1$ is a conversion matrix and y is gamma factor for example equal to "2.4".

In a step 703, the processing module 100 applies a tone mapping to the luma component L' to obtain a tone mapped value $y'_{sdr0}$ as follows:

$$y'_{sdr0} = LUT_{TM}(L') \tag{eq. 2}$$

Where $y'_{sdr0}$ is in a full range of luminance values $(y'_{sdr0} \in [0; 1023])$ and $LUT_{TM}( )$ is a Look Up Table representative of a tone mapping function.

In a step 704, the processing module 100 applies a gammatization to the linear-light RGB signal as follows:

$$\begin{bmatrix} R_S \\ G_S \\ B_S \end{bmatrix} = \begin{bmatrix} R^{\frac{1}{\gamma}} \\ G^{\frac{1}{\gamma}} \\ B^{\frac{1}{\gamma}} \end{bmatrix} \tag{eq. 3}$$

In a step 705, the processing module 100 derives chrominance (chroma) components from the gammatized RGB signal as follows:

$$\begin{bmatrix} u'_{sdr0} \\ v'_{sdr0} \end{bmatrix} = \begin{bmatrix} A_2 \\ A_3 \end{bmatrix} \begin{bmatrix} R_S \\ G_S \\ B_S \end{bmatrix} * 1024 \tag{eq. 4}$$

where $A_2$ and $A_3$ are conversion matrix. $A=[A_1 A_2 A_3]^T$ is for example a canonical 3×3 RGB-to-YUV conversion matrix (e.g. as specified in ITU-R Rec. BT.2020 or ITU-R Rec. BT.709 depending on the color space).

In a step 706, the processing module 100 applies a joint normalization and color correction to the chroma components $u'_{sdr0}$ and $v'_{sdr0}$ to obtain normalized corrected chroma components $u'_{sdr1}$ and $v'_{sdr1}$ as follows:

$$\begin{bmatrix} u'_{sdr1} \\ v'_{sdr1} \end{bmatrix} = \frac{1}{\beta_0(y'_{sdr0})} \cdot \begin{bmatrix} u'_{sdr0} \\ v'_{sdr0} \end{bmatrix} = \frac{1024}{\beta_0(y'_{sdro})} \cdot \begin{bmatrix} A_2 \\ A_3 \end{bmatrix} \begin{bmatrix} R^{\frac{1}{\gamma}} \\ G^{\frac{1}{\gamma}} \\ B^{\frac{1}{\gamma}} \end{bmatrix} \tag{eq. 5}$$

$u'_{sdr1}$ and $v'_{sdr1}$ being clipped between two clipping values [CLIP_MIN;CLIP_MAX] (for example being clipped in [CLIP_MIN=−512; CLIP_MAX=511]).

$$\frac{1}{\beta_0(y'_{sdro})}$$

corresponds to a color correction function and is called ColorCorrection(y) in the following. An example of color correction function ColorCorrection(y) could be derived for example from section 7.2.3.2 of document ETSI TS 103 433-1 v1.3.1. In this document, said color correction function is represented by a set of n tuples (x[i],y[i]), called initial tuples in the following, wherein n=6 and i is an integer value in [0;n−1] in an embodiment.

In a step 707, the processing module 100 applies a chroma injection to the tone mapped luma value $y'_{sdr0}$ to obtain an corrected tone mapped luma value $y'_{sdr1}$ as follows:

$$y'_{sdr1} = y'_{sdr0} - \max(0, a \cdot u'_{sdr1} + b \cdot v'_{sdr1}) \tag{eq. 6}$$

In a step 708, the processing module 40 converts the luma and chroma values $y'_{sdr1}$, $u'_{sdr1}$ and $v'_{sdr1}$ in an given output format. Step 708 comprises a sub-step of adding a value midsample for example equal to "512" to the chroma components $u'_{sdr1}$ and $v'_{sdr1}$, optionally a sub-step of down-sampling the chroma components that compresses the signal by reducing the number of chroma samples, and optionally a sub-step of converting from full range values (YUV components range from "0" to "1023" when encoded in 10 bits) to limited range values (Y component ranges from "64" to "940", and UV components range from "64" to "960") to obtain the luma and chroma components $Y_{sdr}$, $U_{sdr}$, $V_{sdr}$ representative of a pixel of a SDR signal. The objective of step 708 is for example to convert a full range YUV 444 signal in a limited range YUV 420 signal.

Sometimes, for some specific HDR RGB values, the generated SDR chroma components $u'_{sdr1}$ and $v'_{sdr1}$ are higher than CLIP_MAX or are lower than CLIP_MIN and thus are clipped to their maximum possible value (i.e. CLIP_MAX) or to their minimum possible value (i.e. CLIP_MIN). This clipping produces reconstruction errors in the HDR reconstructed signal at the client system side. To get rid of the SDR chroma components clipping, $u'_{sdr1}$ and $v'_{sdr1}$ can be lowered either by decreasing $$\begin{bmatrix} A_2 \\ A_3 \end{bmatrix}$$

coefficient matrix or by decreasing the color correction function ColorCorrection(y)

$$\left( \text{i.e. } \frac{1}{\beta_0(y'_{sdr0})} \right).$$

The method proposed in the following in relation to FIG. 9 uses the color correction function ColorCorrection(y) to get rid of the clipping of $u'_{sdr1}$ and $v'_{sdr1}$ while maintaining saturation and hue consistency.

FIG. 8 illustrates schematically an example of post-processing process. The process of FIG. 8 is executed by the processing module 100 when the processing module 100 implements the post-processing module 34 and more particularly the SDR-to-HDR reconstruction step 34C. The reconstruction process is applied to each pixel of the decoded SDR content generated by the decoding module 32. The reconstruction process of FIG. 8 follows for example the pre-processing processes of FIG. 7. Hence, the signal outputted by the pre-processing process is the input signal of the reconstruction process. The reconstruction process receives therefore a limited range YUV 420 signal.

In a step 801, the processing module 100 converts the received YUV 420 signal to a full range YUV444 signal $Y_{post0}$, $U_{post0}$, $V_{post0}$ (inverse process of step 708).

After conversion, the processing module 100 centers the chroma components $U_{post0}$ and, $V_{post0}$ to obtain centered chroma components $U_{post1}$ and $V_{post1}$. The centering is performed as follows:

$$\begin{cases} U_{post1} = U_{post0} - midsample \\ V_{post1} = V_{post0} - midsample \end{cases}$$

where midsample is for example equal to "512".

In a step 802, the processing module 100 applies a chroma injection correction to the luma component as follows:

$$Y_{post1} = post0 + \max(0; a \times U_{post1} + b \times V_{post1})$$

where the parameters a and b are defined as $mu_0$ and $mu_1$ in section 7.2.4 of document ETSI TS 103 433-1 v1.3.1 and max (x,y) takes the maximum of x and y.

The luma component $Y_{post1}$ is then clipped in [0; 1023] to produce $Y_{post2}$.

In a step 803, the processing module 100 derives the luma component L' by applying an inverse tone mapping to the luma component $Y_{post2}$:

$$L'(Y_{post2}) = LUT\_L[Y_{post2}]$$

In a step 804, the processing module 100 applies an inverse color correction to the centered chroma components $U_{post1}$ and $V_{post1}$ as follows:

$$\begin{bmatrix} U_{post2} \\ V_{post2} \end{bmatrix} = \beta_p(Y_{post2}) \cdot \begin{bmatrix} U_{post1} \\ V_{post1} \end{bmatrix}$$

One can note that $$\beta_0(y'_{sdr0}) = \beta_p(Y_{post2}) \cdot (L'(Y_{post2}))^{\frac{1}{\gamma}}$$

In a step 805, the processing module 100 computes an intermediate RGB signal as follows:

$$\begin{bmatrix} R_1 \\ G_1 \\ B_1 \end{bmatrix} = A^{-1} \cdot \begin{bmatrix} 1 \\ U_{post2} \\ V_{post2} \end{bmatrix}$$

In a step 806, the processing module 100 scales the intermediate RGB signal $$\begin{bmatrix} R_1 \\ G_1 \\ B_1 \end{bmatrix} \text{ by } L':$$

$$\begin{bmatrix} R_2 \\ G_2 \\ B_2 \end{bmatrix} = L'(Y_{post2}) \cdot \begin{bmatrix} R_1 \\ G_1 \\ B_1 \end{bmatrix}$$

In a step 807, the processing module 100 regenerate a linear light signal from the scaled RGB signal:

$$\begin{bmatrix} R \\ G \\ B \end{bmatrix} = \begin{bmatrix} R_2^\gamma \\ G_2^\gamma \\ B_2^\gamma \end{bmatrix}$$

In a step 808, the processing module 100 converts the linear light signal to a desired output format.

Figure 9:
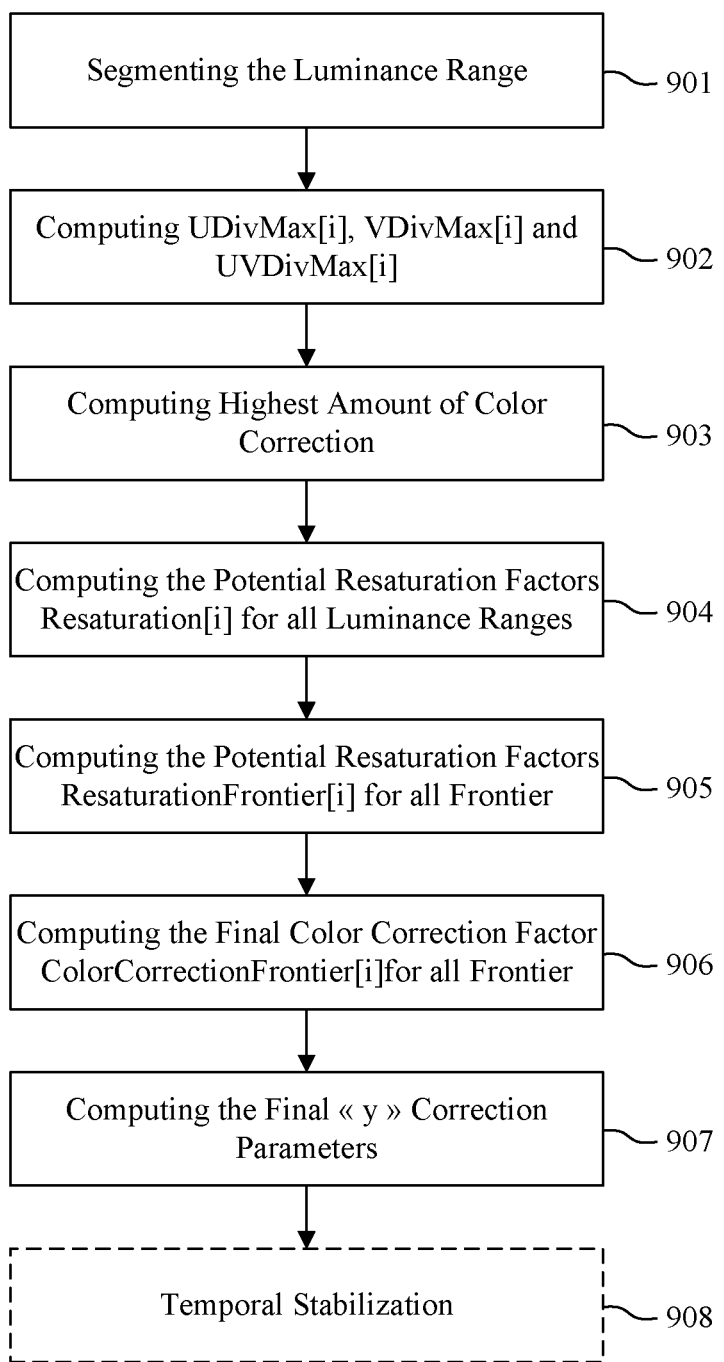
FIG. 9 illustrates schematically an example of a chroma clipping limiter process.

FIG. 9 illustrates schematically an example of a chroma clipping limiter process.

The main intends of this method are twofold:

1. Avoiding SDR chroma component clipping while preserving hue:

If one or both of the U (i.e. $u'_{sdr1}$) or V (i.e. $v'_{sdr1}$) components needs to be lowered by an attenuation value UDivMax for U and/or by an attenuation value VDivMax for V in order to avoid clipping, both the U and V components should be lowered by a same attenuation value UVDivMax, i.e. the highest attenuation value: UVDivMax=MAX(UDivMax, VDivMax). This ensures that the hue of the original HDR content is preserved. As the color correction function ColorCorrection(y) is applied to both $u'_{sdr0}$ and $v'_{sdr0}$ components at the same time, the attenuation value UVDivMax is applied on the color correction function ColorCorrection(y) when computing $u'_{sdr1}$ and $v'_{sdr1}$ (in step 706).

Modifying the color correction function ColorCorrection(y)

$$\left( \text{i.e. } \frac{1}{\beta_0(y'_{sdr0})} \right)$$

need to be compensated by the same amount of correction in the appropriate color correction function $\beta_P(Y_{post2})$ in step 804 to ensure a correct HDR reconstruction. Therefore, the tuples that describe the color correction function ColorCorrection(y)

$$\left( \text{i.e.} \ \frac{1}{\beta_0(y'_{sdr0})} \right)$$

shape are sent to the post-processing module 34 in the metadata that are transmitted by the server 1 to the client system 3.

2. Maintain as much as possible SDR saturation:

If the highest attenuation value (i.e. the highest amount of color correction UVDivMax) is applied to all points of the ColorCorrection(y) function, it risks to desaturate unnecessarily the chroma components for all the luminance range, even if the correction is needed only on a small portion of the luminance range. To avoid unnecessary desaturations, the luminance range of the color correction function ColorCorrection(y) in segmented in a finite number of partial luminance ranges n. When dealing with a "10" bits SDR content, the maximum number of partial luminance ranges "n" is "1023", i.e. each value of y can have a specific color correction function ColorCorrection(y) value.

In each partial luminance range i (i=[0;n−1]), attenuation values UDivMax[i], VDivMax[i] and UVDivMax[i] are computed. The highest attenuation value (i.e. the highest amount of color correction) UVDivMax is the maximum value of all the attenuation values UVDivMax[i].

A resaturation factor over the highest amount of color correction UVDivMax may be applied in each partial luminance range by computing a resaturation factor Resaturation[i]=UVDivMax/UVDivMax[i] with i=[0;n−1]. This potentially allows resaturation for each partial luminance range, still avoiding UV components clipping in this partial luminance range.

Each frontier of two consecutive partial luminance ranges is assigned to one of the n initial tuple (x[i],y[i]) representing the color correction function ColorCorrection(y) (n=6 in the case of SL-HDRT). A resaturation factor ResaturationFrontier[j] with j=[0 . . . n−2] that can be applied at this frontier is the minimum value of the resaturation factors Resaturation [i] of the two consecutive ranges that surround this frontier.

Then a color correction factor that can be applied at each frontier is computed as ColorCorrectionFrontier[j]=UVDivMax/ResaturationFrontier[j].

Finally the color correction factors at the frontiers ColorCorrectionFrontier[j] are used to modify the color correction function ColorCorrection(y).

This above process, detailed below in relation to FIG. 9, insures that for each of the partial luminance range:

UV clipping is avoided while preserving hue;

saturation is maintained as much as possible.

The method of FIG. 9 is executed on a current image during the pre-processing process of FIG. 7 after step 706 by the processing module 100 of the server 1.

In a step 901, the processing module 100 segments the full range of luminance values (i.e. [0 . . . 1023] for example) in n+1 partial luminance ranges.

Each frontier between two consecutive partial luminance ranges corresponds to a given x[i] coordinate of one of the initial tuples (x[i],y[i]) representing the color correction function ColorCorrection( ). In the example of SL-HDR1, n+1=7 partial luminance ranges and n=6 frontiers are defined, corresponding to the n=6 initial tuples (x[i], y[i]) allowed for defining the color correction function ColorCorrection(y). In some cases, the "6" initial tuples(x[i], y[i]) have default values. As an example, the x[i] values could be equally distributed over the "1024" values of the full range of luminance values. For instance x[0]=146, x[1]=292, x[2]=438, x[3]=584, x[4]=730, x[5]=876.

Optionally, another mapping of the n partial luminance ranges frontiers could be derived, for example, from an analysis of the current image to pre-process (e.g. from a luminance histogram of said current image). This mapping could be dynamic per image or static for all images belonging to a scene (a scene is defined by two scene cuts in its two ends).

The y[i] values have a default value y default, i.e. y[0]=y[1]=y[2]=y[3]=y[4]=y[5]=y default.

In the SL-HDR1 case, the color correction function ColorCorrection(y) is described using at maximum six 8-bits tuples, named sgf_x[i] and sgf_y[i], hence ranging from "0" to "255". The specific SL-HDR1 values can therefore be for instance: sgf_x[0]=36, sgf_x[1]=73, sgf_x[2]=109, sgf_x[3]=146, sgf_x[4]=182, sgf_x[5]=219 and sgf_y[i]=128 with i in [0 . . . 5]. x[i] and y[i] can then be derived respectively from sgf_x[i] and sgf_y[i] for a larger range such as the full luminance range [0;1024].

In a step 902, the processing module 100 estimates an attenuation value for the chroma components in each partial luminance range, said attenuation value allowing lowering the chroma components to avoid a clipping of said component. In other words, the processing module 100 estimates the attenuation values UDivMax[i] for the component U and VDivMax[i] for the component V and the highest attenuation value: UVDivMax[i] for i=0 to n.

Figure 11:
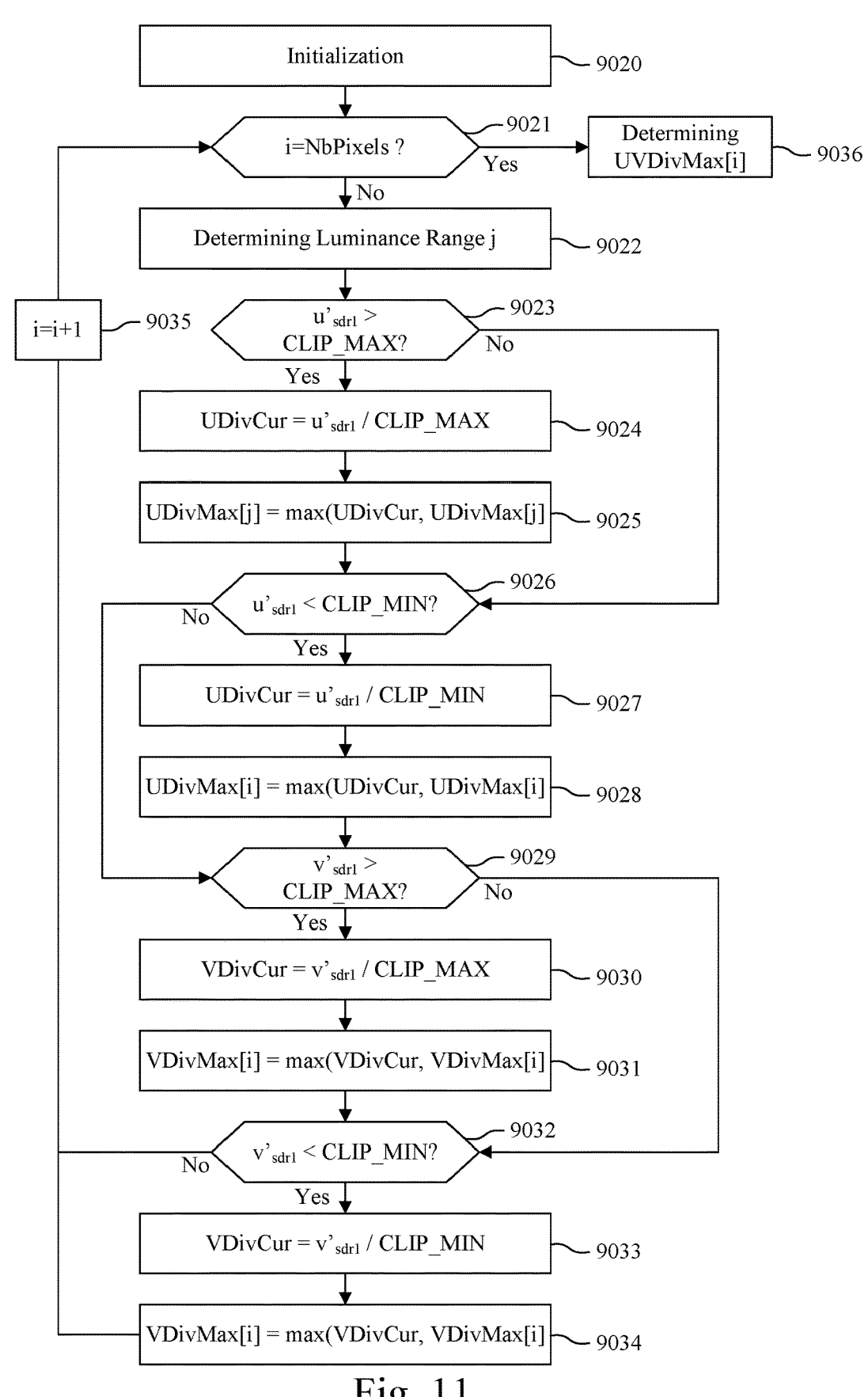
FIG. 11 represents schematically a process for determining an attenuation value for chroma components in partial luminance ranges.

FIG. 11 represents schematically a process for determining an attenuation value for chroma components in each partial luminance range.

In a step 9020, the processing module 100 initializes the attenuation values UDivMax[j] and VDivMax[j] to "1" for each possible value of j from "0" to n, intermediate attenuation values UDivCur and VDivCur to "1" and a variable i to "0".

In step 9021, the processing module 100 determines if i is equal to a value NbPixels, wherein NbPixels represents a number of pixels in the current image to pre-process. In step 9021, the processing module 100 obtains the values of the component of a $i^{st}$ pixel of the current image ($y'_{sdr0}$, $u'_{sdr1}$, $v'_{sdr1}$).

If i<NbPixels, step 9021 is followed by a step 9022.

In step 9022, the processing module 100 determines the partial luminance range (identified by an identifier j) to which belong the current pixel. In an embodiment, the partial luminance range identifier j is determined as follows:

$$j=\mathrm{INT}(y'_{sdr0}/(\mathrm{FullRangeMaxValue}/(n+1))+0.5)$$

wherein INT(x) takes the integer value of x, FullRangeMaxValue is the maximum value of the full range of luminance values. In the current example, FullRangeMaxValue=1023 and n+1=7 (corresponding to the number of partial luminance ranges which depends on the number of initial tuples (x[i], y[i]) defining the color correction function ColorCorrection(y)).

In a step 9023, the processing module 100 compares the value u'$_{sdr1}$ of the component U to a maximum clipping value CLIP_MAX. In the current example of embodiment, CLIP_MAX=511. If u'$_{sdr1}$>CLIP_MAX, step 9023 is followed by step 9024. Otherwise step 9023 is followed by step 9026.

In step 9024, the processing module 100 computes an intermediate attenuation value UDivCur for component U as follows:

$$UDivCur=u'_{sdr1}/CLIP\_MAX$$

In a step 9025, the processing module 100 computes an attenuation value UDivMax[j] for component U for the partial luminance range identified in step 9022 as follows:

$$UDivMax[j]=max(UDivCur,UDivMax[j])$$

Step 9025 is followed by step 9026.

In a step 9026, the processing module 100 compares the value u'$_{sdr1}$ of the component U to the minimum clipping value CLIP_MIN. In the current example of embodiment, CLIP_MIN=−512. If u'$_{sdr1}$<CLIP_MIN, step 9026 is followed by step 9027. Otherwise step 9026 is followed by step 9029.

In step 9027, the processing module 100 computes an intermediate attenuation value UDivCur for the component U as follows:

$$UDivCur=u'_{sdr1}/CLIP\_MIN$$

In a step 9028, the processing module 100 computes an attenuation value UDivMax[j] for the component U for the partial luminance range identified in step 9022 as follows:

$$UDivMax[j]=max(UDivCur,UDivMax[j])$$

In step 9029, the processing module 100 compares the value v'$_{sdr1}$ of the V component to the maximum clipping value CLIP_MAX. If v'$_{sdr1}$>CLIP_MAX, step 9029 is followed by step 9030. Otherwise step 9029 is followed by a step 9032.

In step 9030, the processing module 100 computes an intermediate attenuation value VDivCur for component V as follows:

$$VDivCur=v'_{sdr1}/CLIP\_MAX$$

In a step 9031, the processing module 100 computes an attenuation value VDivMax[j] for component V for the partial luminance range identified in step 9022 as follows:

$$VDivMax[j]=max(VDivCur,VDivMax[j])$$

In a step 9032, the processing module 100 compares the value v'$_{sdr1}$ of the component V to the minimum clipping value CLIP_MIN. In the current example of embodiment, CLIP_MIN=−512. If v'$_{sdr1}$<CLIP_MIN, step 9032 is followed by step 9033. Otherwise step 9032 is followed by step 9035.

In step 9033, the processing module 100 computes an intermediate attenuation value VDivCur for the component V as follows:

$$VDivCur=v'_{sdr1}/CLIP\_MIN$$

In a step 9034, the processing module 100 computes an attenuation value VDivMax[j] for the component V for the partial luminance range identified in step 9022 as follows:

$$VDivMax[j]=max(VDivCur,VDivMax[j])$$

In step 9035, the variable i is incremented of one unit. If i=NbPixels, an attenuation value for chroma components U and V is determined in each partial luminance range in a step 9036. In each partial luminance range, the attenuation value for chroma components U and V is determined as follows:

$$UVDivMax[j]=MAX(UDivMax[j],VDivMax[j])$$

In a first variant of the process of FIG. 11, a filtering is applied for computing the intermediate attenuation values UDivCur and VDivCur of the i$^{st}$ pixel by computing a weighted average with the intermediate attenuation values UDivCur and VDivCur computed for at least one pixel neighboring the i$^{st}$ pixel.

In a second variant of the process of FIG. 11, a histogram of all different values of UDivCur and VDivCur is computed. This allow to detect some high UDivCur and VDivCur values that may appear erratically due to noise present in the current image. In that case, there is no need to apply the high intermediate attenuation values UDivCur and VDivCur corresponding to said noise on all the pixels. Thus consistent intermediate attenuation values UDivCur and VDivCur can be estimated by forcing a fixed predetermined minimum count of intermediate attenuation values UDivCur and VDivCur by counting the number of bins present in the histogram, starting from the highest bins.

Back to FIG. 9, in a step 903, the processing module 100 determines a global attenuation value for the chroma components (i.e. a highest amount of color correction) UVDivMax from the attenuation values for the chroma components U and V UVDivMax[j] determined for each partial luminance range:

$$UVDivMax=MAX(UVDivMaxPartial[j]) \text{ with } j=[0;n]$$

In a step 904, the processing module 100 computes a resaturation factor Resaturation[j] for each partial luminance range as follows:

$$Resaturation[j]=UVDivMax/UVDivMax[j]$$
$$\text{with } j=[0;n]$$

The resaturation factor allows maintaining a saturation in (i.e. allows resaturing) each partial luminance range, still avoiding a clipping of chroma components U and V in this partial luminance range.

In a step 905, the processing module 100 computes, for each frontier between two consecutive partial luminance ranges, a value ResaturationFrontier[j] (j=[0;n−1] representing a minimum of the resaturation factors computed for these two consecutive partial luminance ranges. As an example, if n=6:

ResaturationFrontier [0]=MIN(Resaturation [0], Resaturation [1]);
ResaturationFrontier [1]=MIN(Resaturation [1], Resaturation [2]);
ResaturationFrontier [2]=MIN(Resaturation [2], Resaturation [3]);
ResaturationFrontier [3]=MIN(Resaturation [3], Resaturation [4]);
ResaturationFrontier [4]=MIN(Resaturation [4], Resaturation [5]);
ResaturationFrontier [5]=MIN(Resaturation [5], Resaturation [6]).

In a step 906, the processing module 100 computes a final correction factor ColorCorrectionFrontier[j] for each frontier between two consecutives partial luminance ranges as follows:

$$ColorCorrectionFrontier[j]=ResaturationFrontier[j]/UVDivMax, \text{ with } j \text{ in } [0;n-1].$$

In a step 907, the processing module 100 multiplies each coordinate y[i] of the initial tuples (x[i],y[i]) representing the color correction function ColorCorrection(y) by a corresponding final correction factor ColorCorrectionFrontier[ ]:

$$y'[j]=y[j]*ColorCorrectionFrontier[j], \text{ with } j \text{ in } [0;n-1]$$

Step 907 allows obtaining new tuples preventing the clipping of SDR chroma components while maintaining saturation and preserving hue of the derived SDR signal. Step 907 consists therefore in modifying the coordinate y[i] of the initial tuples (x[i],y[i]) using the final correction factor ColorCorrectionFrontier[i] to obtain a new color correction function ColorCorrection'(y). Step 907 modifies a coordinate y[i] of at least one tuple (x[i],y[i]).

The n new tuples (y'[i], x[i]), where i is an integer value in [0;n−1], are used in a second execution of step 706 and transmitted in the metadata to the client system 3 in place of the initial tuples (y[i], x[i]). The post-processing process remains identical to the process described in relation to FIG. 8 except in that the new tuples (y'[i], x[i]) are used instead of the initial tuples (y[i], x[i]) to derive the function $\beta_P($ ).

Figure 12:
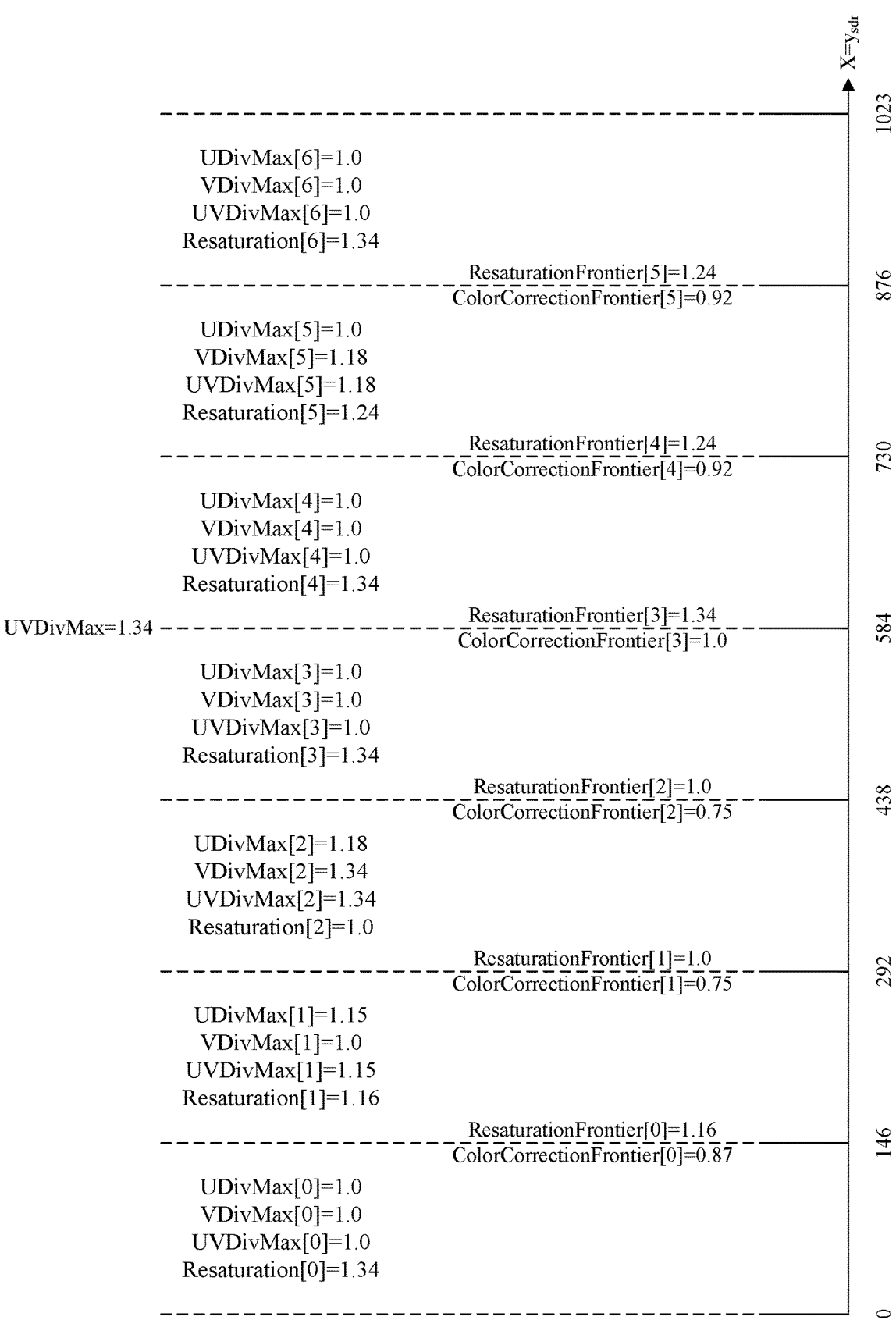
FIG. 12 illustrates an execution of the chroma clipping limiter process.

FIG. 12 illustrates an execution of the chroma clipping limiter process of FIG. 9 using a HDR test pattern made of BT2020 primary and secondary colors.

In an embodiment of the chroma clipping limiter process, said process comprises as step 908 of temporal stabilization of the new tuples (x[i],y'[i]).

In a first variant of step 908, a temporal stabilization is applied to the coordinates y'[i] of the new tuples (x[i],y'[i]) representing the new color correction function ColorCorrection'(y). For example, for each i in [0; n−1], a final parameter yfinal[i] could be computed as a weighted average of the parameters y'[i] computed for the current image and at least one parameter y'[i] computed for at least one preceding image.

In a second variant of step 908, a temporal stabilization could be applied on the coordinate x[j] of the initial tuples (x[i],y[i]) (j in [0;n−1]), assuming that these parameters don't have a fixed predefined value, but a value coming from an analysis of the current image or a scene comprising the current image.

Figure 10A:
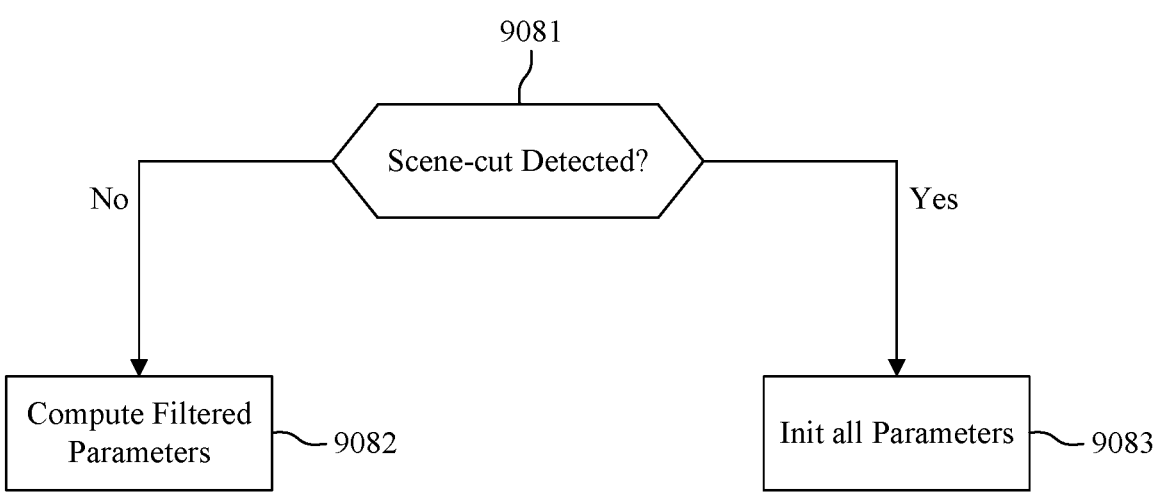
FIG. 10A illustrates schematically a first example of a temporal stabilization process.

FIG. 10A illustrates schematically a first example of a temporal stabilization process. Only the temporal stabilization of the coordinates y'[i] of the new tuples (x[i], y'[i]) is considered here. The exact same principle could also be applied to the temporal stabilisation of the coordinates x[i].

A main idea of the temporal stabilization is to collect over a pre-determined period of time preceding the current time (i.e. in a pre-determined set of images preceding the current image), the values of each of the coordinates y'[i] and to deliver at the current time a filtered version yfinal[i] of each of these coordinates y'[j].

In a step 9081, the processing module 100 determines if a scene cut is detected between the current image and the preceding images.

If a scene cut is detected, the processing module executes a step 9083.

During step 9083, the coordinates y'[i] of the new tuples (x[i], y'[i]) are initialized.

Figure 13:
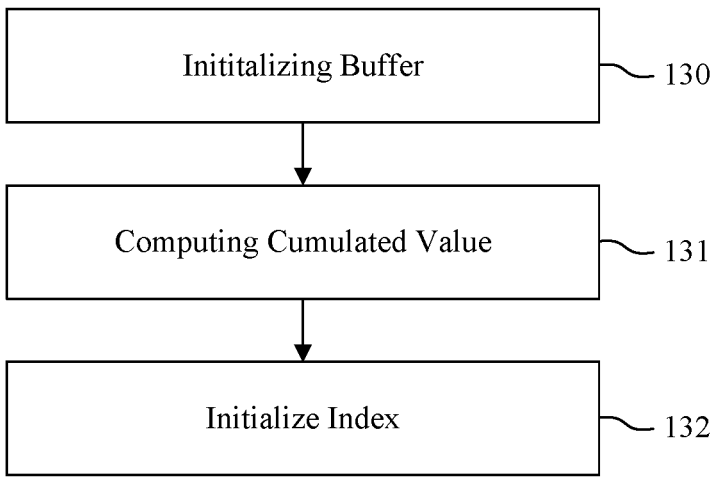
FIG. 13 illustrates a first detail of the temporal stabilization process; and, FIG. 14 illustrates a second detail of the temporal stabilization process.

FIG. 13 represents a detail of step 9083.

In a step 130, for each coordinate y'[i], a configurable buffer of size nbuf is initialized. The size nbuf of the buffer represents a number of successive images that are analyzed to compute the filtered version yfinal[i] of the current coordinate y'[i]. The buffer size nbuf can be the same for all coordinates y'[i] or can be different. Each value of each buffer is initialized as described below:

$$y\_buf[i][j]=y'[j], \text{ with } i \text{ in } [0;nbuf-1] \text{ and } j \text{ in } [0;n-1]$$

As can be seen, here the variable i allows parsing the coordinates y'[j] of the successive images considered for the temporal filtering, and j allows parsing the coordinates y'[j] for a same image.

In a step 131, for each parameter y'[j], a cumulated value cum_y'[j] representative of all the values of the corresponding buffer is computed by the processing module 100:

$$cum\_y'[j]=f(y\_buf[i][j]), \text{ with } i \text{ in } [0;nbuf-1] \text{ and } j \text{ in } [0;n-1]$$

The function f( ) could be a simple sum, or a weighted sum that gives more weight to a specific position in the buffer.

As an example, if the cumulated value is a simple sum for all coordinates, the cumulated value cum_y'[j] for each coordinate y'[j] is:

cum_

$$y'[j] = \sum_{i=0}^{nbuf-1} y\_buf[i][j]$$

In a step 132, the processing module 100 initializes an index index representative of the position of the current frame in the frame buffer to "0".

If no scene cut is detected, the processing module executes a step 9082.

Figure 14:
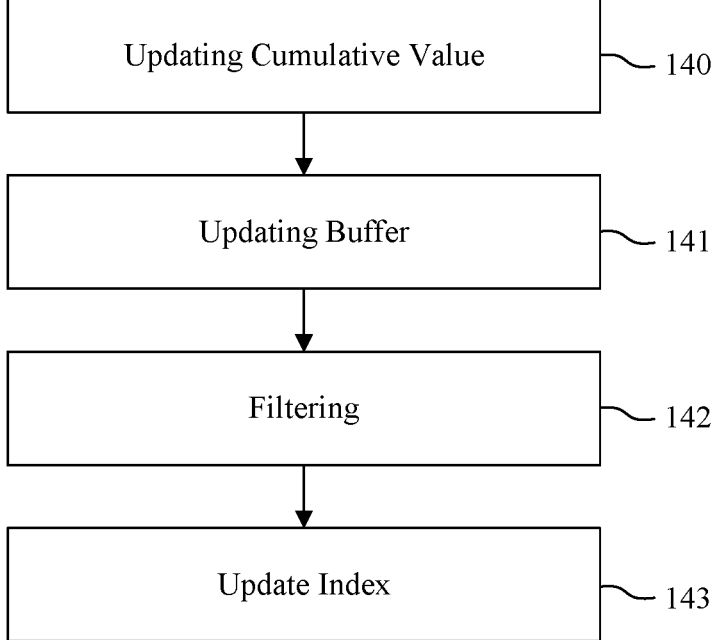

FIG. 14 represents a detail of step 9082.

In a step 140, the processing module 100 updates the cumulative value cum_y'[j] corresponding to each parameter y'[i] by:

substracting the value of the oldest coordinate y'[i] in the buffer y_buf[i][j] from cum_y'[j]. Said oldest coordinate is at a position i=index in the buffer y_buf[i][j]. Substracting can be a simple or a weighted substraction of a combination between the oldest coordinate value and any of the following one;

adding the value of the last computed coordinate y'[i] that has just been received to cum_y'[j]. The addition can be a simple or a weighted sum of a combination between the last computed coordinate and any of the preceding one.

In a step 141, for each coordinate y'[i], the processing module 100 updates the buffer y_buf[i][j] by inserting the last computed coordinate y'[i] at position i=index in said buffer.

In a step 142, the processing module 100 computes a filtered value yfinal[j] for each coordinate y'[j]. In an embodiment, the filtering consists in a simple division of the corresponding cumulated value cum_y'[j] by the size of the corresponding buffer nbuf. In another embodiment, the filtering consists in a division of the corresponding cumulated value cum_y'[j] by a number of frames that were taken into account when computing said cumulated value.

As an example, if the cumulated value is a simple sum for all coordinates and if the filtered value is a simple division by the buffer size nbuf, all filtered values are computed as follow:

$$cum\_y'[j]=cum\_y'[j]-y\_buf[index][j]+y'[j];$$

$$y\_buf[index][j]=y[j];$$

$$yfinal[j]=cum\_y'[j]/nbuf;$$

with j in [0;n−1].

In a step 143, the processing module 100 updates the index index as follows:

$$index=index+1 \text{ and then, if } index=n\text{buf then}$$
$$index=0.$$

In an embodiment the buffer size nbuf=30.

Figure 10B:
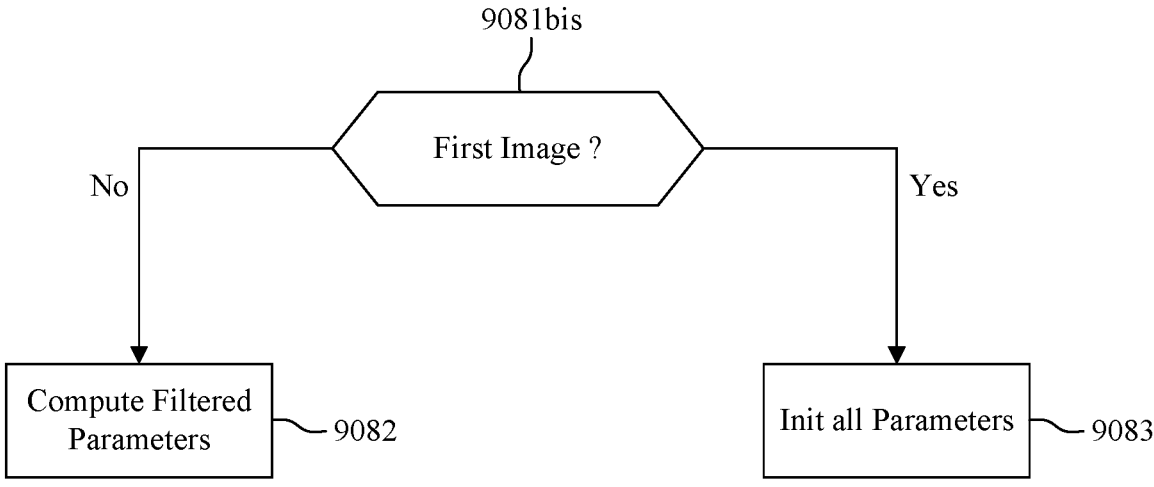
FIG. 10B illustrates schematically a second example of a temporal stabilization process.

FIG. 10B illustrates schematically a second example of a temporal stabilization process.

Comparing to FIG. 10A, all steps are identical except step 9081 which is replaced by step 9081*bis*.

In step 9081*bis*, the processing module determines if the current image is the first image of the current content. If yes, step 9081*bis* is followed by step 9083.

Otherwise, step 9081*bis* is followed by step 9082.

We described above a number of embodiments. Features of these embodiments can be provided alone or in any combination. Further, embodiments can include one or more of the following features, devices, or aspects, alone or in any combination, across various claim categories and types:

A bitstream or signal that includes one or more of the described image data or video data, or variations thereof.

Creating and/or transmitting and/or receiving and/or decoding a bitstream or signal that includes one or more of the described image data or metadata, or variations thereof.

A server, camera, TV, set-top box, cell phone, tablet, personal computer or other electronic device that performs at least one of the embodiments described.

A TV, set-top box, cell phone, tablet, personal computer or other electronic device that performs at least one of the embodiments described, and that displays (e.g. using a monitor, screen, or other type of display) a resulting image.

A TV, set-top box, cell phone, tablet, personal computer or other electronic device that tunes (e.g. using a tuner) a channel to receive a signal including encoded images and metadata, and performs at least one of the embodiments described.

A TV, set-top box, cell phone, tablet, or other electronic device that receives (e.g. using an antenna) a signal over the air that includes an encoded images and metadata, and performs at least one of the embodiments described.

A server, camera, cell phone, tablet, personal computer or other electronic device that tunes (e.g. using a tuner) a channel to transmit a signal including encoded images and metadata, and performs at least one of the embodiments described.

A server, camera, cell phone, tablet, personal computer or other electronic device that transmits (e.g. using an antenna) a signal over the air that includes encoded images and metadata, and performs at least one of the embodiments described.

The invention claimed is:

1. A method for modifying a color correction function intended to correct initial chroma components of a current image represented by an initial luma component and the initial chroma components to obtain corrected chroma components, the color correction function being defined by a set of initial tuples comprising a first coordinate and a second coordinate, the method comprising, for the current image:

segmenting a range of luminance values of the initial luma component in partial luminance ranges, each frontier between two consecutive partial luminance ranges depending on a first coordinate of one of the initial tuples;

estimating an attenuation value for the initial chroma components in at least one partial luminance range, each attenuation value allowing lowering the initial chroma components to avoid a clipping of the initial chroma components;

determining a global attenuation value for the initial chroma components using the estimated attenuation values;

computing a factor for each partial luminance range allowing maintaining a saturation in each partial luminance range based on the global attenuation value and the attenuation value associated to the partial luminance range;

for each frontier between two consecutive luminance ranges, computing a minimum factor representing a minimum of the factors computed for these two consecutive partial luminance ranges;

computing a final correction factor for each frontier between two consecutives partial luminance ranges based on the minimum factor corresponding to the frontier and the global attenuation value; and modifying the second coordinate of at least one of the initial tuples using the final correction factors to obtain new tuples defining a new color correction function.

2. The method of claim 1, wherein the method comprises a temporal stabilization of the new tuples comprising computing the new tuples based on a filtering using new tuples computed for images preceding the current image in a sequence of images.

3. The method of claim 2, wherein the temporal stabilization is executed in a set of images of the sequence of images belonging to a same scene between two scene cuts.

4. The method of claim 1, further comprising:

applying a color correction on the initial chroma components based on the new color correction function.

5. The method of claim 1, further comprising:

transmitting data representative of the new tuples to the client system in the form of metadata.

6. An apparatus for modifying a color correction function intended to correct initial chroma components of a current image represented by an initial luma component and the initial chroma components to obtain corrected chroma components, the color correction function being defined by a set of initial tuples comprising a first coordinate and a second coordinate, the apparatus comprising electronic circuitry configured for:

segmenting a range of luminance values of the initial luma component in partial luminance ranges, each frontier between two consecutive partial luminance ranges depending on a first coordinate of one of the initial tuples;

estimating an attenuation value for the initial chroma components in at least one partial luminance range, each attenuation value allowing lowering the initial chroma components to avoid a clipping of the initial chroma components;

determining a global attenuation value for the initial chroma components using the estimated attenuation values determined for each partial luminance range;

computing a factor for each partial luminance range allowing maintaining a saturation in each partial luminance range based on the global attenuation value and the attenuation value associated to the partial luminance range;

computing, for each frontier between two consecutive luminance ranges, a minimum factor representing a minimum of the factors computed for these two consecutive partial luminance ranges;

computing a final correction factor for each frontier between two consecutives partial luminance ranges based on the minimum factor corresponding to the frontier and the global attenuation value; and modifying the second coordinate of at least one of the initial tuples using the final correction factors to obtain new tuples defining a new color correction function.

7. The apparatus of claim 6, wherein the electronic circuitry is further configured for applying a temporal stabilization of the new tuples comprising computing the new tuples based on a filtering using new tuples computed for images preceding the current image in a sequence of images.

8. The apparatus of claim 7, comprising electronic circuitry configured for applying the temporal stabilization in a set of images of the sequence of images belonging to a same scene between two scene cuts.

9. The apparatus of claim 6, further comprising:

electronic circuitry configured for applying a color correction on the initial chroma components based on the new color correction function.

10. The apparatus of claim 6, further comprising:

electronic circuitry configured for transmitting data representative of the new tuples to the client system in the form of metadata.

11. A non-transitory information storage medium storing program code instructions, which when executed by one or more processors, cause the one or more processors to implement a method for modifying a color correction function intended to correct initial chroma components of a current image represented by an initial luma component and the initial chroma components to obtain corrected chroma components, the color correction function being defined by a set of initial tuples comprising a first coordinate and a second coordinate, the method comprising, for the current image:

segmenting a range of luminance values of the initial luma component in partial luminance ranges, each frontier between two consecutive partial luminance ranges depending on a first coordinate of one of the initial tuples;

estimating an attenuation value for the initial chroma components in at least one partial luminance range, each attenuation value allowing lowering the initial chroma components to avoid a clipping of the initial chroma components;

determining a global attenuation value for the initial chroma components using the estimated attenuation values;

computing a factor for each partial luminance range allowing maintaining a saturation in each partial luminance range based on the global attenuation value and the attenuation value associated to the partial luminance range;

for each frontier between two consecutive luminance ranges, computing a minimum factor representing a minimum of the factors computed for these two consecutive partial luminance ranges;

computing a final correction factor for each frontier between two consecutives partial luminance ranges based on the minimum factor corresponding to the frontier and the global attenuation value; and modifying the second coordinate of at least one of the initial tuples using the final correction factors to obtain new tuples defining a new color correction function.

12. The non-transitory information storage medium of claim 11, wherein the method comprises a temporal stabilization of the new tuples comprising computing the new tuples based on a filtering using new tuples computed for images preceding the current image in a sequence of images.

13. The non-transitory information storage medium of claim 12, wherein the temporal stabilization is executed in a set of images of the sequence of images belonging to a same scene between two scene cuts.

14. The non-transitory information storage medium of claim 11, wherein the method further comprises:

applying a color correction on the initial chroma components based on the new color correction function.

15. The non-transitory information storage medium of claim 11, wherein the method further comprises:

transmitting data representative of the new tuples to the client system in the form of metadata.

* * * * *